US010388021B2

(12) United States Patent
Genda

(10) Patent No.: US 10,388,021 B2
(45) Date of Patent: Aug. 20, 2019

(54) IMAGE PROCESSING APPARATUS, IMAGE FORMING APPARATUS AND PROGRAM

(71) Applicant: KONICA MINOLTA, INC., Chiyoda-ku, Tokyo (JP)

(72) Inventor: Daisuke Genda, Kawasaki (JP)

(73) Assignee: KONICA MINOLTA, INC., Tokyo (JP)

(*) Notice: Subject to any disclaimer, the term of this patent is extended or adjusted under 35 U.S.C. 154(b) by 98 days.

(21) Appl. No.: 15/654,232

(22) Filed: Jul. 19, 2017

(65) Prior Publication Data

US 2018/0061062 A1 Mar. 1, 2018

(30) Foreign Application Priority Data

Aug. 31, 2016 (JP) .................................. 2016-168828

(51) Int. Cl.
*G06K 9/00* (2006.01)
*G06T 7/13* (2017.01)
(Continued)

(52) U.S. Cl.
CPC ............... *G06T 7/13* (2017.01); *G06T 3/606* (2013.01); *G06T 5/002* (2013.01); *H04N 1/4092* (2013.01); *H04N 1/41* (2013.01); *H04N 19/124* (2014.11); *H04N 19/136* (2014.11); *H04N 19/14* (2014.11); *H04N 19/176* (2014.11); *H04N 19/182* (2014.11); *H04N 19/48* (2014.11);
(Continued)

(58) Field of Classification Search
None
See application file for complete search history.

(56) References Cited

U.S. PATENT DOCUMENTS

2005/0117812 A1* 6/2005 Nishi .................. H04N 19/176
382/268
2009/0092331 A1* 4/2009 Genda .................... H04N 1/41
382/251
(Continued)

FOREIGN PATENT DOCUMENTS

JP 2009058765 A 3/2009
JP 2013070359 A 4/2013

OTHER PUBLICATIONS

Chinese Office Action (and English language translation thereof) dated Mar. 5, 2019 issued in Chinese Application No. 201710738237.3.

*Primary Examiner* — Hadi Akhavannik
(74) *Attorney, Agent, or Firm* — Holtz, Holtz & Volek PC

(57) ABSTRACT

An image processing apparatus includes a hardware processor that: divides each of pixels of image data in units of blocks, and compresses the image data using a maximum value and a minimum value of a pixel value in each of the divided blocks; extracts a maximum value and a minimum value of each of the blocks from the compressed image data; detects an edge of an object on the basis of at least one of the extracted maximum value and the minimum value of each of the blocks; performs edge correction of the compressed image data by increasing or decreasing the maximum value and the minimum value of each of the blocks within a correction range from the detected edge; and decompresses the image data that have undergone edge correction, using the maximum value and the minimum value of each of the blocks.

12 Claims, 8 Drawing Sheets

(51) Int. Cl.
*G06T 3/60* (2006.01)
*G06T 5/00* (2006.01)
*H04N 1/409* (2006.01)
*H04N 1/41* (2006.01)
*H04N 19/176* (2014.01)
*H04N 19/124* (2014.01)
*H04N 19/136* (2014.01)
*H04N 19/14* (2014.01)
*H04N 19/182* (2014.01)
*H04N 19/48* (2014.01)
*G06T 7/136* (2017.01)

(52) U.S. Cl.
CPC .......... *G06T 7/136* (2017.01); *G06T 2200/12* (2013.01); *G06T 2207/20021* (2013.01); *G06T 2207/20192* (2013.01)

(56) References Cited

U.S. PATENT DOCUMENTS

| | | | |
|---|---|---|---|
| 2012/0045144 A1* | 2/2012 | Kanemitsu | H04N 5/208 382/266 |
| 2013/0057924 A1* | 3/2013 | Genda | G06K 9/44 358/3.27 |
| 2018/0225809 A1* | 8/2018 | Washio | G06T 5/003 |

* cited by examiner

FIG. 7

SHIFT DIRECTION Dy ↑

ORIGINAL IMAGE DATA

| 255 | 255 | 255 | 255 |
|---|---|---|---|
| 255 | 255 | 255 | 255 |
| 255 | 255 | 255 | 255 |
| 255 | 255 | 255 | 255 |
| 255 | 255 | 255 | 255 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |
| 0 | 0 | 0 | 0 |

EDGE

COMPRESSED IMAGE DATA

- B11: Max=255, min=255
- B12: Max=255, min=0
- B13: Max=0, min=0
- B14: Max=0, min=0

FIG. 10

| | CORRECTED IMAGE DATA | DECOMPRESSED IMAGE DATA | | | |
|---|---|---|---|---|---|
| B11 | Max=220 min=220 | 220 | 220 | 220 | 220 |
| | | 220 | 220 | 220 | 220 |
| | | 220 | 220 | 220 | 220 |
| | | 220 | 220 | 220 | 220 |
| B12 | Max=200 min=0 | 200 | 200 | 200 | 200 |
| | | 0 | 0 | 0 | 0 |
| | | 0 | 0 | 0 | 0 |
| | | 0 | 0 | 0 | 0 |
| B13 | Max=0 min=0 | 0 | 0 | 0 | 0 |
| | | 0 | 0 | 0 | 0 |
| | | 0 | 0 | 0 | 0 |
| | | 0 | 0 | 0 | 0 |
| B14 | Max=0 min=0 | 0 | 0 | 0 | 0 |
| | | 0 | 0 | 0 | 0 |
| | | 0 | 0 | 0 | 0 |
| | | 0 | 0 | 0 | 0 |

SHIFT DIRECTION Dy ↑

EDGE (between row of 200s and following row of 0s in B12)

IMAGE PROCESSING APPARATUS, IMAGE FORMING APPARATUS AND PROGRAM

Japanese Patent Application No. 2016-168828 filed on Aug. 31, 2016, including description, claims, drawings, and abstract the entire disclosure is incorporated herein by reference in its entirety.

BACKGROUND

Technological Field

The present invention relates to an image processing apparatus, an image forming apparatus, and a program.

Description of the Related Art

Developing methods in an electrophotographic process include a with-method of rotating a developing sleeve and a photoreceptor in a same direction and a counter-method of rotating the developing sleeve and the photoreceptor in an opposite direction. In the counter-method, there might be a phenomenon in which the toner in an image portion such as a character and a figure is swept by the developing sleeve rotating in the direction opposite to the photoreceptor and image density decreases at a front end side and increases at a rear end side. In the with-method, opposite phenomenon occurs on the front end side and the rear end side of the image.

In related art, efforts to eliminate density variation due to such sweeping of toner have been attempted by correcting image data. For example, edge correction of increasing or decreasing a pixel value in the vicinity of an edge of an image is performed in accordance with a varying density (refer to JP 2013-70359 A, for example). Moreover, there is proposed a method for generating a correction object that makes sweeping less perceivable (refer to JP 2009-58765 A, for example).

However, performing edge correction on high-resolution image data, for example, image data of 1200 dpi by software processing would take a long processing time because of the large data amount. On the other hand, performing edge correction by hardware processing would need a large capacity memory for holding image data, leading to an expanded circuit scale, even though it can reduce the processing time.

SUMMARY

An object of the present invention is to reduce the time needed for edge correction.

To achieve the abovementioned object, according to an aspect of the present invention, an image processing apparatus reflecting one aspect of the present invention comprises
 a hardware processor that:
  divides each of pixels of image data in units of blocks, and compresses the image data using a maximum value and a minimum value of a pixel value in each of the divided blocks;
  extracts a maximum value and a minimum value of each of the blocks from the compressed image data;
  detects an edge of an object on the basis of at least one of the extracted maximum value and the minimum value of each of the blocks;
  performs edge correction of the compressed image data by increasing or decreasing the maximum value and the minimum value of each of the blocks within a correction range from the detected edge; and
  decompresses the image data that have undergone edge correction, using the maximum value and the minimum value of each of the blocks.

BRIEF DESCRIPTION OF THE DRAWING

The advantages and features provided by one or more embodiments of the invention will become more fully understood from the detailed description given hereinbelow and the appended drawings which are given by way of illustration only, and thus are not intended as a definition of the limits of the present invention:

FIG. 7 is a diagram illustrating exemplary original image data and compressed image data;

FIG. 10 is a diagram illustrating an exemplary corrected image data and decompressed image data.

DETAILED DESCRIPTION OF EMBODIMENTS

Hereinafter, one or more embodiments of an image processing apparatus, an image forming apparatus, and a program according to the present invention will be described with reference to the drawings. However, the scope of the invention is not limited to the disclosed embodiments.

Figure 1:
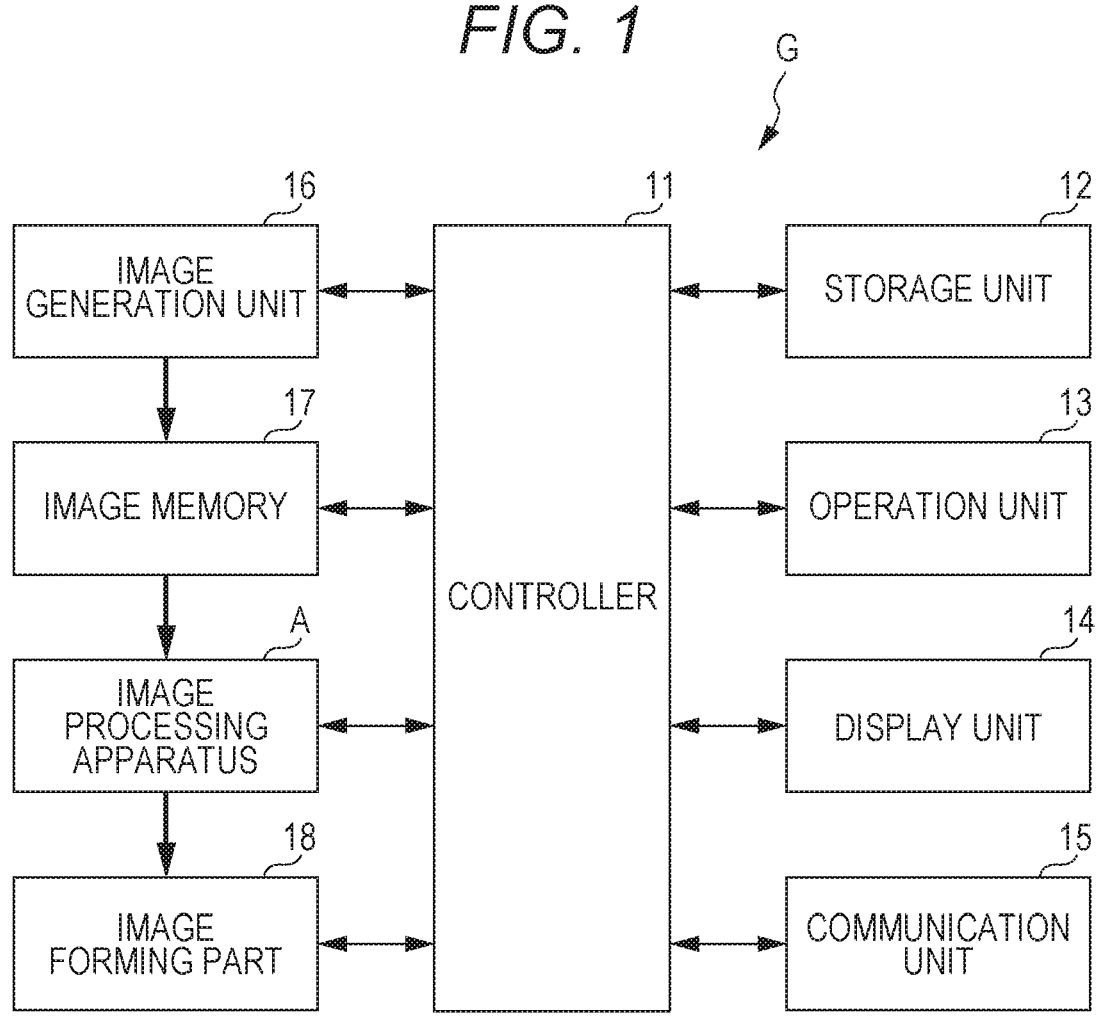
FIG. 1 is a functional block diagram illustrating a configuration of an image forming apparatus according to an embodiment of the present invention.

FIG. 1 illustrates a functional configuration of an image forming apparatus G according to an embodiment of the present invention. As illustrated in FIG. 1, the image forming apparatus G includes a controller 11, a storage unit 12, an operation unit 13, a display unit 14, a communication unit 15, an image generation unit 16, an image memory 17, an image processing apparatus A, and an image forming part 18.

The controller 11 includes a central processing unit (CPU), a random access memory (RAM), and controls each of portions by reading and executing various programs from the storage unit 12.

For example, the controller 11 causes the image processing apparatus A to perform image processing on the image data generated by the image generation unit 16 and held in the image memory 17, and causes the image forming part 18 to form an image on a sheet on the basis of the image-processed image data.

The storage unit 12 stores a program that is readable by the controller 11, a file to be used at execution of programs, or the like. As the storage unit 12, a large capacity memory such as a hard disk is usable.

The operation unit 13 generates an operation signal according to user's operation and outputs the generated signal to the controller 11. As the operation unit 13, a keypad, a touch panel integrated with the display unit 14, or the like, are usable.

The display unit 14 displays an operation screen, or the like, in accordance with an instruction from the controller 11. As the display unit 14, a liquid crystal display (LCD), an organic electroluminescence display (OELD), or the like, are usable.

The communication unit 15 communicates with an external device on a network, for example, a user terminal, a server, and another image forming apparatus.

The communication unit 15 receives data (hereinafter referred to as PDL data) in which instruction content for forming an image is described in a page description language (PDL) from a user terminal, or the like, via a network.

The image generation unit 16 performs rasterization processing on the PDL data received by the communication unit 15, and generates image data in a bitmap format. The image data are formed such that each of pixels has pixel values of four colors cyan (C), magenta (M), yellow (Y) and black (K). The pixel value is a data value representing the shade of the image, and the data value of 8 bits represents the shades of 0 to 255 gradations, for example.

The image generation unit 16 can generate attribute data indicating an attribute of each of the pixels of the image data.

For example, the image generation unit 16 can determine, at the rasterization processing, the attribute of each of the pixels of the image such as kana, alphabet, numeral drawn in accordance with the description of the character code in the PDL data as a character (Text). Moreover, the image generation unit 16 can determine the attribute of each of the pixels of an image such as a polygon, a circle, a ruled line drawn in accordance with the description of a vector format such as DXF, SVG, and WMF as a figure (Graphics) and can determine the attribute of the image such as a photographic image drawn as a JPEG-format file as a photograph (Image).

The image memory 17 is a buffer memory that temporarily holds the image data generated by the image generation unit 16. As the image memory 17, a dynamic RAM (DRAM), or the like, is usable.

The image processing apparatus A reads image data from the image memory 17 and performs various image processing on the image data.

Figure 2:
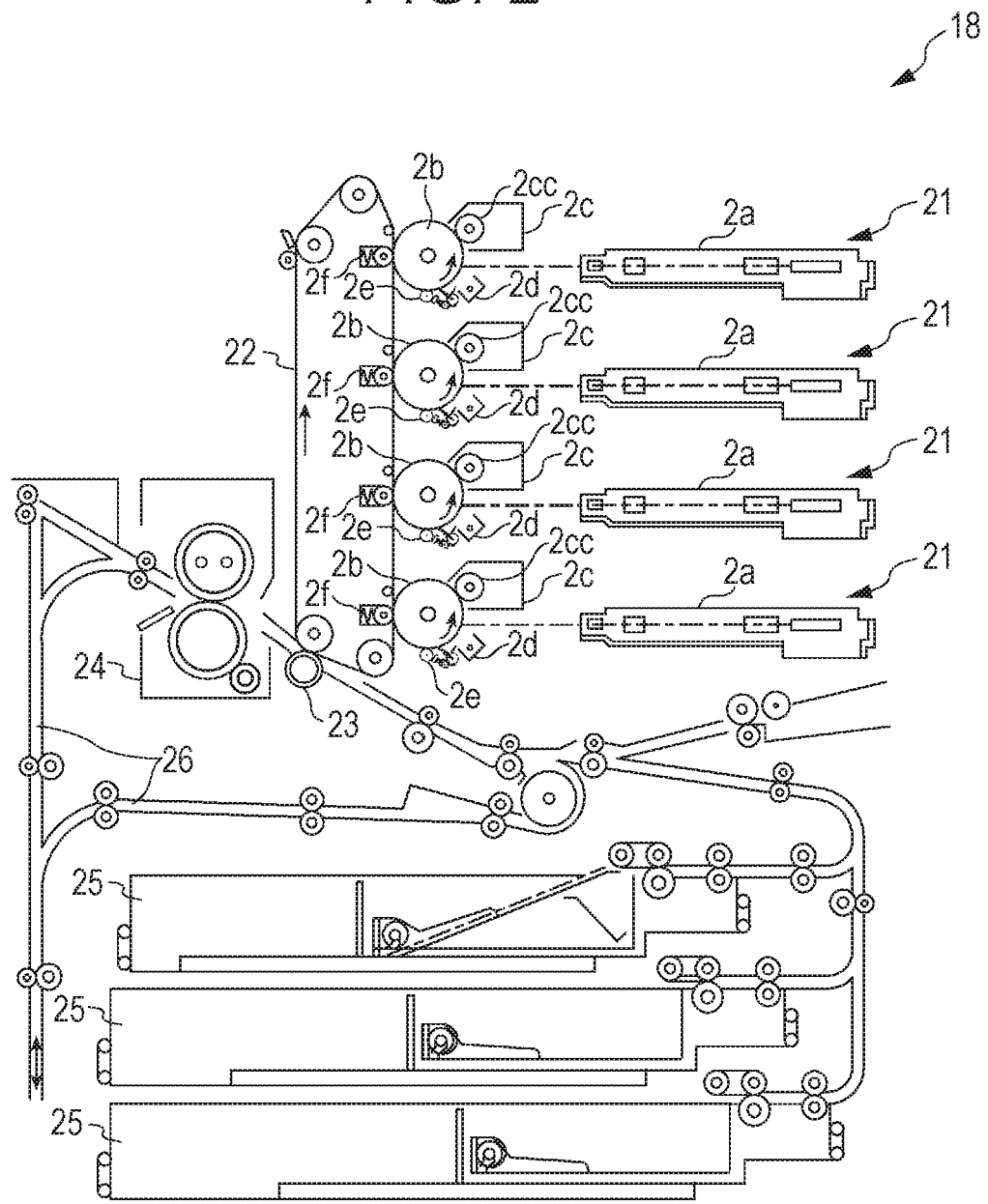
FIG. 2 is a front view schematically illustrating a configuration of an electrophotographic image forming part.

The image forming part 18 forms an image formed with four colors on a sheet in accordance with the pixel values of the four colors C, M, Y, and K of each of the pixels of the image data image-processed by the image processing apparatus A. FIG. 2 illustrates an exemplary configuration of the electrophotographic image forming part 18.

As illustrated in FIG. 2, the image forming part 18 includes four writing units 21, an intermediate transfer belt 22, a secondary transfer roller 23, a fixing apparatus 24, a sheet feed tray 25.

The four writing units 21 are arranged in series (tandem) along a belt surface of the intermediate transfer belt 22 and form images of individual colors of C, M, Y, and K. As illustrated in FIG. 2, the individual writing units 21 have a same configuration although they form images in different colors and each of the units includes an exposure unit 2a, a photoreceptor 2b, a developing unit 2c, a charging unit 2d, a cleaning unit 2e, and a primary transfer roller 2f.

At the time of image formation, each of the writing units 21 forms an electrostatic latent image by first charging the photoreceptor 2b by the charging unit 2d, and then, scanning on the rotating photoreceptor 2b with a luminous flux emitted by the exposure unit 2a on the basis of the image data. The developing unit 2c includes a developing sleeve 2cc and develops the electrostatic latent image on the photoreceptor 2b by supplying toner onto the photoreceptor 2b by the developing sleeve 2cc. In this manner, individual images formed on the photoreceptors 2b of the four writing units 21 are sequentially superimposed and transferred (primary transfer) onto the intermediate transfer belt 22 by the individual primary transfer rollers 2f. With this processing, an image formed with individual colors is formed on the intermediate transfer belt 22. After the primary transfer, the toner remaining on the photoreceptor 2b is removed by the cleaning unit 2e.

The image forming part 18 feeds the sheet from the sheet feed tray 25, transfers (secondary transfer) the image from the intermediate transfer belt 22 onto the sheet by the secondary transfer roller 23, and thereafter, performs fixing processing by heating and pressing the sheet by the fixing apparatus 24. In a case where images are to be formed on both sides of the sheet, the sheet is conveyed to the conveying path 26 and turned over, and then, conveyed again to the secondary transfer roller 23.

[Image Processing Apparatus]

Figure 3:
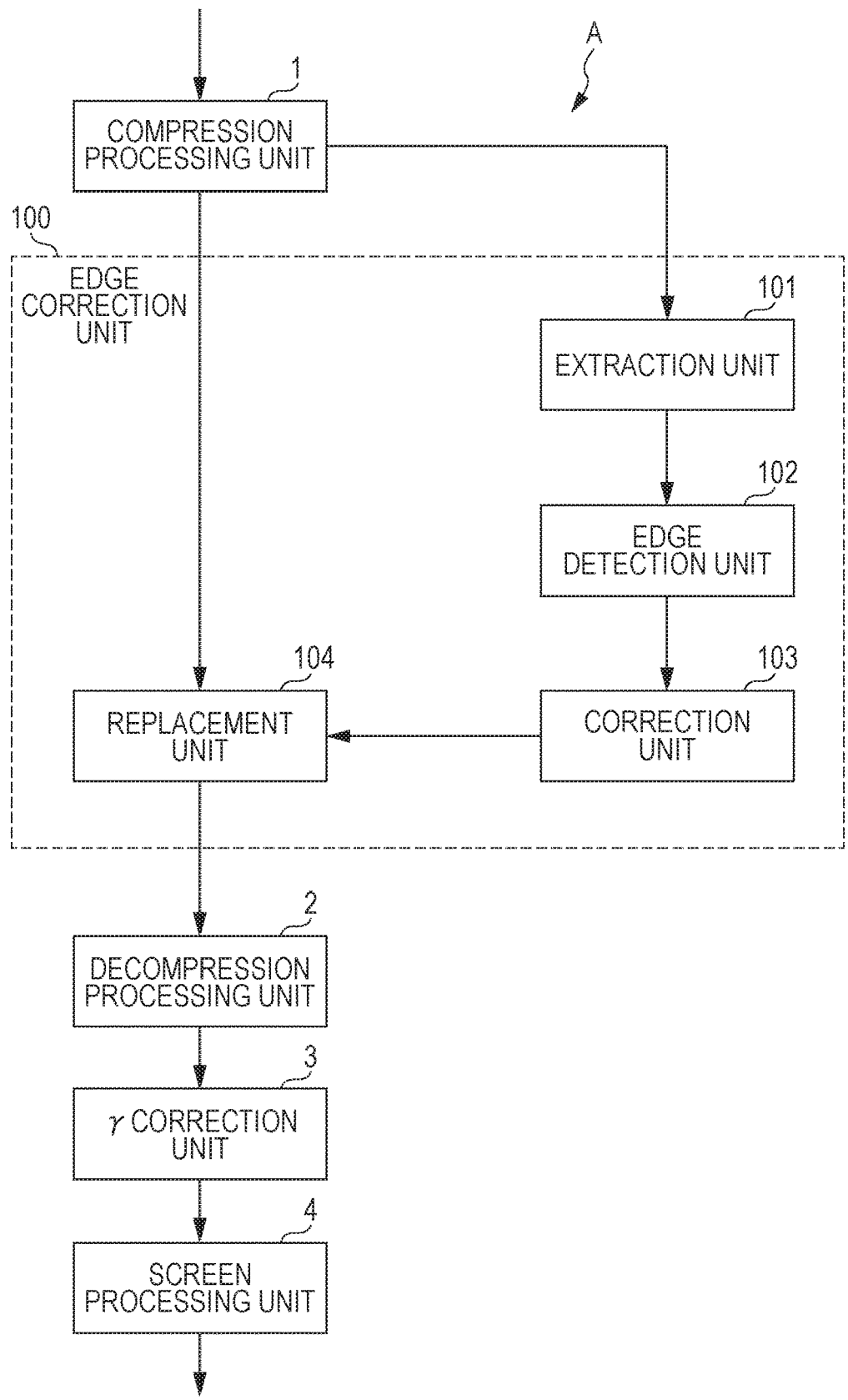
FIG. 3 is a functional block diagram illustrating a configuration of an image processing apparatus according to an embodiment of the present invention.

FIG. 3 illustrates a functional configuration of the image processing apparatus A.

As illustrated in FIG. 3, the image processing apparatus A includes a compression processing unit 1, a decompression processing unit 2, a gamma (γ) correction unit 3, and a screen processing unit 4. Moreover, the image processing apparatus A includes an edge correction unit 100 between the compression processing unit 1 and the decompression processing unit 2.

The image processing apparatus A compresses the input image data by the compression processing unit 1 and temporarily stores the image data in the image memory 17, and thereafter reads the compressed image data from the image memory 17 in accordance with a timing of image formation, and decompresses the image data by the decompression processing unit 2. The image processing apparatus A performs γ correction on the decompressed image data by the γ correction unit 3, performs screen processing by the screen processing unit 4, and outputs the processed image to the image forming part 18. The γ correction is image processing of correcting the pixel value of the image data so as to set a density characteristic of the image to be formed on the sheet to a target density characteristic. The screen processing is image processing of reproducing pseudo halftones by converting the pixel values of the image data on the basis of a threshold set in a dither matrix. The image processing techniques described herein are merely examples, and other image processing techniques may be performed in the image processing apparatus A.

[Compression Processing]

The compression processing unit 1 divides image data into blocks and compresses the image data using a maximum value and a minimum value of the pixel values in each of the divided blocks.

The compression method used by the compression processing unit 1 is not particularly limited as long as it is a method capable of compressing the image data using the maximum value and the minimum value of the pixel values of each of the blocks. For example, block truncation coding (BTC) compression and 3Dc are usable as the method.

Figure 4:
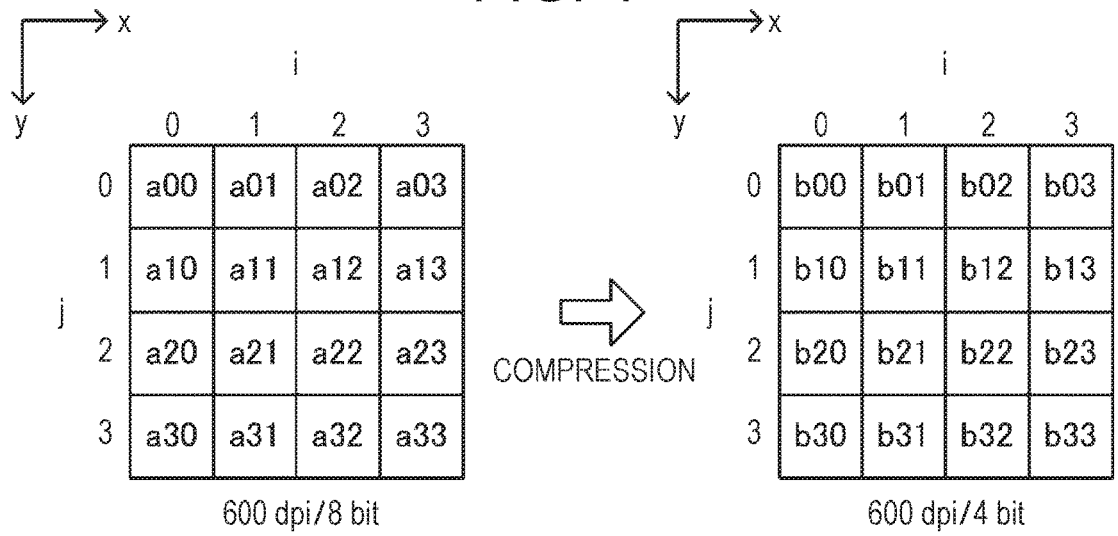
FIG. 4 is a diagram illustrating exemplary blocks before and after compression.

Hereinafter, an exemplary case where image data having a resolution of 600 dpi and 8-bit pixel values for one pixel are divided into blocks of 4×4 pixels by BTC compression and compressed into image data having a resolution of 600 dpi and 4-bit pixel values for one pixel will be described. FIG. 4 illustrates a block of 4×4 pixels before and after compression. As illustrated in FIG. 4, the block before compression is formed with 16 pixels each of which having 8-bit pixel values aij (a00 to a33). While the block after compression has the same resolution as before compression and is formed with 16 pixels, the pixel values of individual pixels are converted into 4-bit pixel values bij (b00 to b33). Note that i represents the position of each of the pixels in a main scanning direction x within the block and j represents the position in a sub scanning direction y.

The compression processing unit 1 determines a maximum value Max and a minimum value min of the pixel values in each of the divided blocks and calculates seven thresholds TH1 to TH7 that divide the value range from the determined minimum value min to the maximum value Max into eight ranges.

$TH1=\min+(\text{Max}-\min)\times 1/14$ $TH2=\min+(\text{Max}-\min)\times 3/14$ $TH3=\min+(\text{Max}-\min)\times 5/14$ $TH4=\min+(\text{Max}-\min)\times 7/14$ $TH5=\min+(\text{Max}-\min)\times 9/14$ $TH6=\min+(\text{Max}-\min)\times 11/14$ $TH7=\min+(\text{Max}-\min)\times 13/14$ Using the calculated thresholds TH1 to TH7, the compression processing unit 1 converts each of the pixel values aij in the block into a 3-bit pixel value bij as indicated in the following formulas.

When $\min \leq aij < TH1$, $bij=000$

When $TH1 \leq aij < TH2$, $bij=001$

When $TH2 \leq aij < TH3$, $bij=010$

When $TH3 \leq aij < TH4$, $bij=011$

When $TH4 \leq aij < TH5$, $bij=100$

When $TH5 \leq aij < TH6$, $bij=101$

When $TH6 \leq aij < TH7$, $bij=110$

When $TH7 \leq aij \leq \text{Max}$, $bij=111$

The compression processing unit 1 incorporates each one bit of the maximum value Max and the minimum value min of 8 bits as the least significant bit of the 3-bit pixel values bij of each of the pixels in the block, and outputs the obtained 4-bit pixel values bij as compressed image data.

Figure 5:
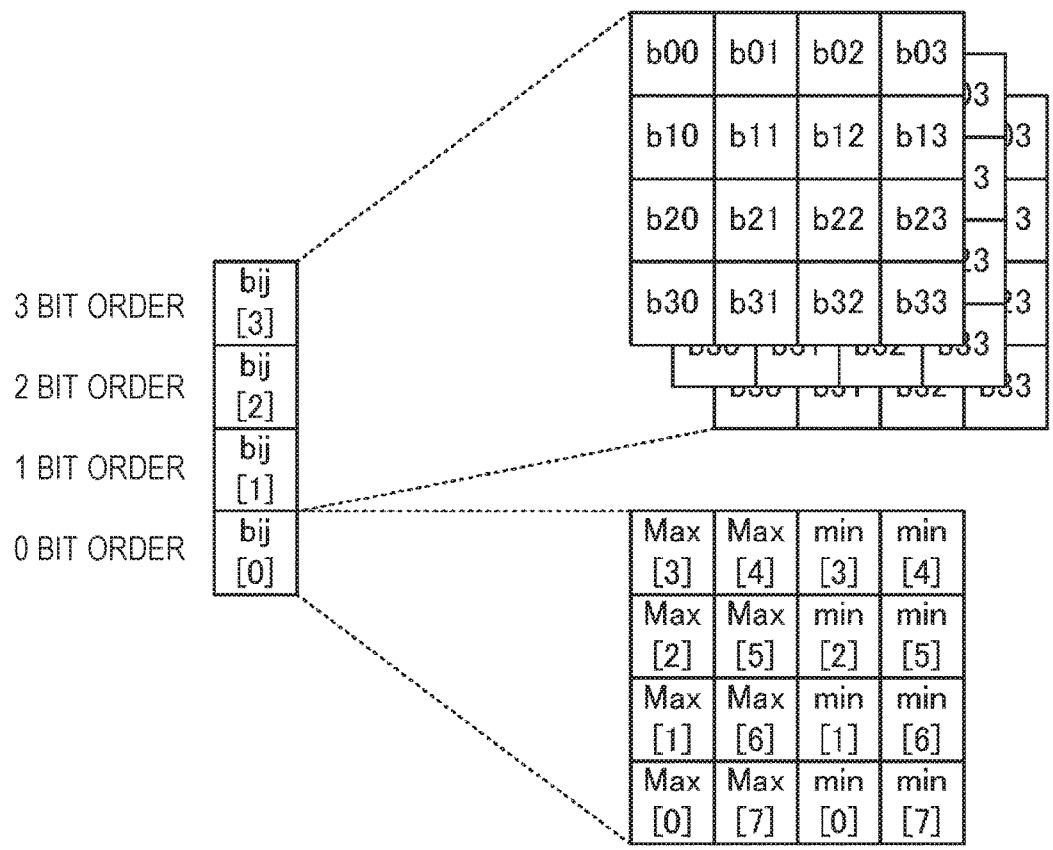
FIG. 5 is a diagram illustrating a data configuration of image data after compression.

FIG. 5 illustrates a data configuration of the block of 4×4 pixels after compression.

As illustrated in FIG. 5, in a case where the image data of the compressed block are expressed as the planes bij [0] to [3] which are data layers of 4×4 pixels at individual bit orders 0 to 3, the upper planes bij [1] to [3] hold 3-bit pixel values bij obtained by converting the pixel value aij of each of the pixels. Moreover, the lowest order plane bij [0] holds one bit of each of the 8-bit maximum value Max and the 8-bit minimum value min. In FIG. 5, each of Max [0] to Max [7] and min [0] to min [7] represents one bit of each of the bit orders 0 to 7 among the 8-bit maximum value Max and the 8-bit minimum value min.

[Decompression Processing]

The decompression processing unit 2 extracts the maximum value Max and the minimum value min of each of the blocks from the compressed image data and decompresses the compressed image data using the maximum value Max and the minimum value min.

In the case of the above-described BTC compression, the decompression processing unit 2 extracts Max [0] to Max [7] and min [0] to min [7] held in the plane bij [0] and obtains an 8-bit maximum value Max and an 8-bit minimum value min.

Using the obtained 8-bit maximum value Max and 8-bit minimum value min, the decompression processing unit 2 converts the 3-bit pixel values bij held in the planes bij [1] to bij [3] into 8-bit pixel values a*ij, respectively as illustrated in the following formula and outputs the data as the decompressed image data.

When $bij=000$, $a^*ij=\min+(\text{Max}-\min)\times 0/14$

When $bij=001$, $a^*ij=\min+(\text{Max}-\min)\times 2/14$

When $bij=010$, $a^*ij=\min+(\text{Max}-\min)\times 4/14$

When $bij=011$, $a^*ij=\min+(\text{Max}-\min)\times 6/14$

When $bij=100$, $a^*ij=\min+(\text{Max}-\min)\times 8/14$

When $bij=101$, $a\ ij=\min+(\text{Max}-\min)\times 10/14$

When $bij=110$, $a^*ij=\min+(\text{Max}-\min)\times 12/14$

When $bij=111$, $a^*ij=\min+(\text{Max}-\min)\times 14/14$

While an example of 4/8 compression of compressing 8 bits to 4 bits has been described above, the compression rate can be arbitrarily set. For example, by converting the 8-bit pixel value aij into 2-bit pixel value bij using thresholds TH1 to TH3 that equally divide values from the minimum value min to the maximum value Max into four and by adding one bit of each of the 8-bit maximum value Max and the 8-bit minimum value min to the least significant bit, it is possible to perform 3/8 compression of compressing 8 bits to 3 bits.

[Edge Correction]

As illustrated in FIG. 3, the edge correction unit 100 includes an extraction unit 101, an edge detection unit 102, a correction unit 103, and a replacement unit 104.

Processing content of the extraction unit 101, the edge detection unit 102, the correction unit 103, and the replacement unit 104 of the edge correction unit 100 can be implemented by hardware processing using image processing circuits such as an application specific integrated circuit (ASIC) and a field-programmable gate array (FPGA) or by software processing in which a processor such as a CPU and a graphics processing unit (GPU) reads and executes a program.

The extraction unit 101 inputs the image data compressed by the compression processing unit 1 and extracts the maximum value Max and the minimum value min of each of the blocks from the image data. In the case of the above-described 4/8 compression, the extraction unit 101 extracts Max [7] to Max [0] and min [7] to min [0] from the least significant bit plane bij [0], thereby obtaining the 8-bit maximum value Max and the 8-bit minimum value min.

[Edge Detection]

The edge detection unit 102 detects an edge of an object by using at least one of the maximum value Max and the minimum value min of each of the blocks extracted by the extraction unit 101. The object is an image portion such as characters and figures formed by toner. When the sweeping of toner occurs, density variation occurs on the front end side and the rear end side of the object in a shift direction of the image to be formed on the photoreceptor 2b by the toner in the image forming part 18 (that is, a rotation direction of the photoreceptor 2b and the transportation direction of the sheet on which the image is formed). Therefore, in a case where edge correction for eliminating density variation due to sweeping of the toner, the edge detection unit 102 detects the edge of the front end or the rear end of the object in the image shift direction.

Figure 6:
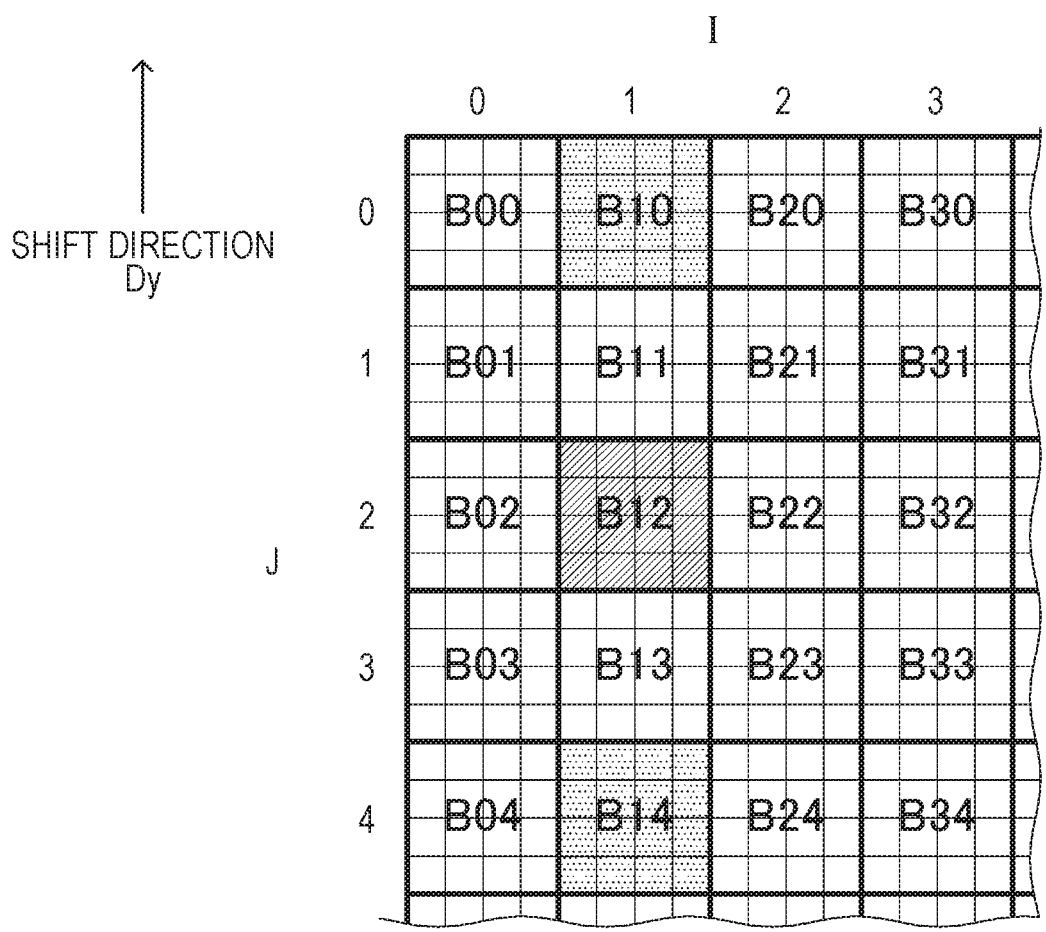
FIG. 6 is a diagram illustrating each of the blocks of compressed image data.

Specifically, the edge detection unit 102 compares the maximum value Max of each of the blocks with the maximum value Max of the block d blocks ahead of or behind each of the blocks in the image shift direction. FIG. 6 illustrates the individual blocks BIJ of the image data. In FIG. 6, I represents the position of each of the blocks in the main scanning direction x, and J represents the position in the sub-scanning direction y.

For example, as illustrated in FIG. 6, in a case where block B12 is a block of interest, the edge detection unit 102 compares the maximum value Max of block of interest B12 with the maximum value Max of block B10 located two blocks ahead in an image shift direction Dy or with the maximum value Max of block B14 located two blocks behind.

In a case where the maximum value Max of the block of interest and the maximum value Max of the block of d blocks ahead compared with each other satisfy the following formula (1), the edge detection unit 102 detects the edge at the front end of the object. Moreover, in a case where the maximum values Max of the block of interest and the block of d blocks behind compared with each other satisfy the following formula (2), the edge detection unit 102 detects the edge at the rear end of the object. In either case, the block of interest includes an outline pixel of the object.

$$\text{Max}(I,J)-\text{Max}(I,J-d)>Th \quad (1)$$

$$\text{Max}(I,J)-\text{Max}(I,J+d)>Th \quad (2)$$

In the above-described formulas (1) and (2), Max(I, J) represents the maximum value Max of the block of interest BIJ. Max(I,J−d) represents the maximum value Max of the block BI(J−d) that is d blocks ahead of the block of interest BIJ and Max(I,J+d) represents the maximum value Max of the block BI(J+d) that is d blocks behind the block of interest BIJ. Th represents a threshold for edge detection.

FIG. 7 illustrates original image data and compressed image data.

As illustrated in FIG. 7, block B11 is a portion of the object, and the original pixel value of each of the pixels is 255. The maximum value Max and the minimum value min of compressed block B11 are 255 and 255, respectively. Block B12 includes an edge at the rear end of the object, and thus, pixels having original pixel value of 255 and pixels having original pixel value 0 are mixed in block B12. The maximum value Max of compressed block B12 is 255, and the minimum value min is 0. Blocks B13 and B14 are background of the object and the original pixel values of individual pixels are all 0, and thus, the maximum value Max and the minimum value min of compressed blocks B13 and B14 are all 0.

When block B12 is the block of interest, since the maximum value Max of each of block B12 and block B14 satisfies the above-described formula (2), the edge detection unit 102 detects the edge at the rear end in block B12. Note that even in a case where the above-described formulas (1) or (2) is satisfied, it is preferable that the edge detection unit 102 disables edge detection in a case where the number of blocks detected from the previous edge detection is a fixed value or less. With this configuration, it is possible to prevent false detection of an edge when a continuous monotonous increase or monotonous decrease of the pixel value continues.

Note that in a case where an edge can be detected using at least one of the maximum value Max and the minimum value min, another edge detection method is also usable.

For example, it is allowable to first compare the maximum values Max with each other and compare the minimum values min with each other between the block of interest and the block adjacent to the block of interest, and to detect an edge in a case where the maximum value Max of block of interest≥the maximum value Max of adjacent block is satisfied, and at the same time, where the minimum value min of block of interest−the minimum value min of adjacent block>Th is satisfied.

Moreover, there is a case where the orientation of the sheet is rotated and the image to be formed is also rotated in accordance with the sheet rotation in the image forming part 18. In this case, it is sufficient that the edge detection unit 102 rotates the image data orientation in accordance with the shift direction of the rotated image and detects the edge of the front end or the rear end of the object.

Since the sweeping of the toner occurs in the shift direction of the image, it is possible to perform correction to eliminate density variation due to sweeping by adjusting the orientation of the image data to the shift direction of the image, even when the orientation of the sheet is rotated.

[Correction]

The correction unit 103 performs edge correction of the compressed image data by increasing or decreasing the maximum value Max and the minimum value min of each of the blocks within a correction range from the edge detected by the edge detection unit 102.

Examples of the edge correction performed by the correction unit 103 include general edge correction such as smoothing (anti-aliasing) processing, edge enhancement processing, in addition to edge correction for eliminating density variation caused by sweeping of the toner.

In a case where the sweeping of the toner occurs, density variation occurs at the front end and the rear end of the object.

Figure 8:
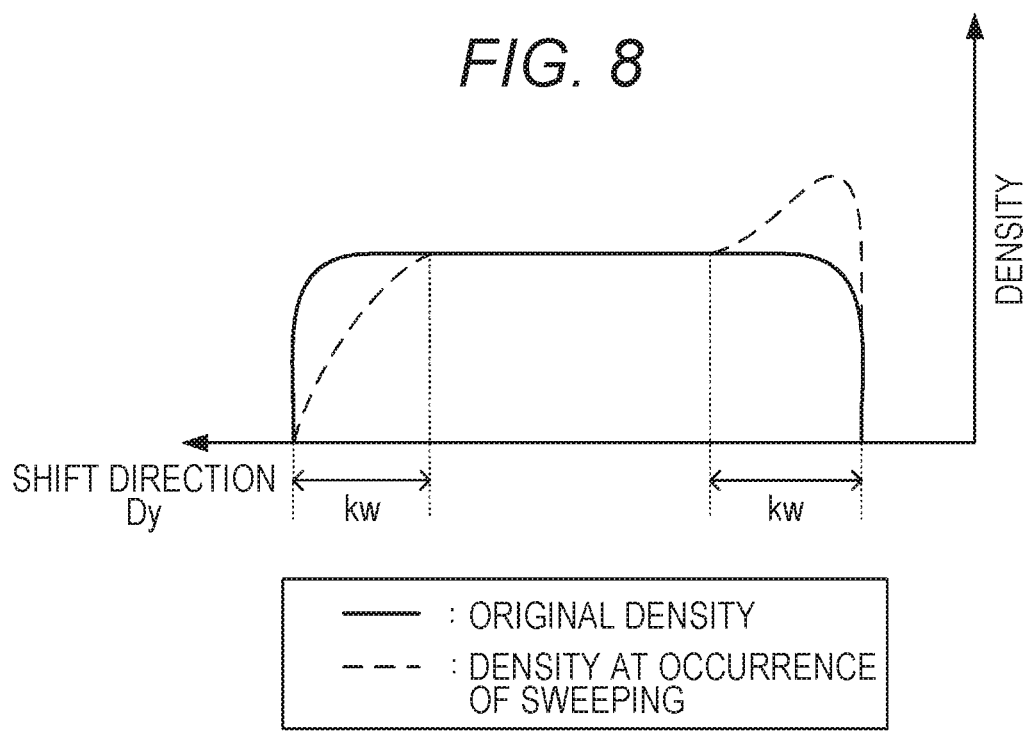
FIG. 8 is a diagram illustrating exemplary density variation caused by sweeping of toner.

FIG. 8 illustrates an exemplary density variation in a case where the developing system is the counter system in which the rotation directions of the photoreceptor 2b and the developing sleeve 2cc are opposite to each other.

As illustrated in FIG. 8, at the front end of the object, the closer to the edge of the front end, the greater the decrease in the density. Moreover, at the rear end of the object, the closer to the edge of the rear end, the greater the increase in the density. In the case of correcting the density variation, in order to be able to reproduce the original density, the correction unit 103 sets a range in which density variation occurs from the edge at the front end and from the edge at the rear end as a correction range kw (unit: block) and increases or decreases the maximum value Max and the minimum value min of each of the blocks inside the object within the correction range kw in accordance with the distance from the edge.

Specifically, on detecting the edge at the front end by the edge detection unit 102, the correction unit 103 calculates the corrected maximum value Max and the minimum value min by the following formula (11).

Moreover, on detecting the edge at the rear end by the edge detection unit 102, the correction unit 103 calculates the corrected maximum value Max and the minimum value min by the following formula (12).

$$\text{Out}(c) = \text{In}(c) + \max\{0, kh \times (1 - c/kw)\} \quad (11)$$

$$\text{Out}(c) = \text{In}(c) - \max\{0, kh \times (1 - c/kw)\} \quad (12)$$

In the above-described formulas (11) and (12), Out(c) represents the corrected maximum value Max or the minimum value min of the block having the distance (number of blocks) c from the edge among the blocks within the correction range kw. In(c) represents the maximum value Max or the minimum value min before correction, of the block having the number of blocks c. max {A,B} represents a function that selects and outputs the larger one of A and B. kh is a correction coefficient for adjusting the correction amount in accordance with the distance from the edge.

Figure 9:
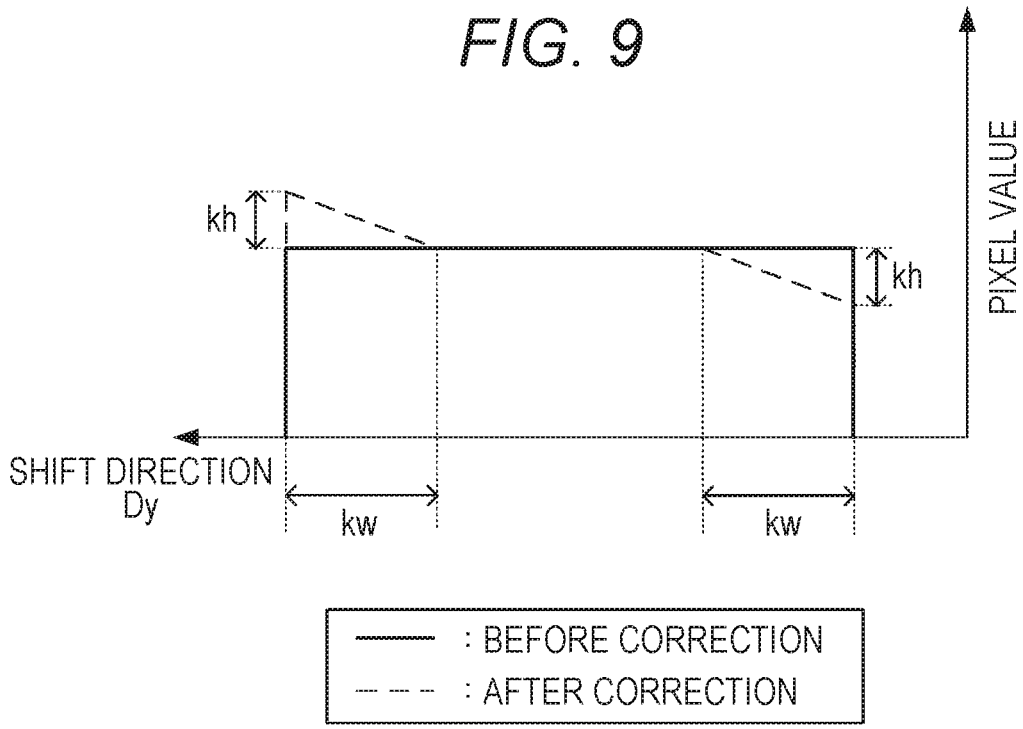
FIG. 9 is a diagram illustrating an exemplary image data correction.

FIG. 9 illustrates exemplary image data correction.

By calculating the corrected maximum value Max and the minimum value min as described above, it is possible to increase the pixel value of each of the blocks inside the object within the correction range kw from the edge at the front end of the object more largely at a portion closer to the edge at the front end, when the compressed image data are decompressed as illustrated in FIG. 9. Moreover, it is possible to decrease the pixel value of each of the blocks inside the object within the correction range kw from the edge at the rear end of the object more largely at a portion closer to the edge at the rear end. With this configuration, it is possible to reproduce the original density illustrated in FIG. 8 even when density variation due to sweeping of the toner occurs.

The correction range kw and the correction coefficient kh can be set arbitrarily. For example, it is possible to set the range having possibility of occurrence of density variation confirmed by actually forming an image as the correction range kw. Similarly, it is possible to confirm the relationship between the distance from the edge and the density variation amount, and to set the correction coefficient kh proportional to the distance from the edge in accordance with the relationship.

Note that, in the development system of with-method in which the photoreceptor 2b and the developing sleeve 2cc rotate in a same direction, a phenomenon opposite to the case of the counter-method occurs, and thus, it is sufficient to perform opposite correction, that is, correction of the maximum value Max and the minimum value min so as to decrease the pixel value at the front end portion and increase the pixel value at the rear end portion.

It is preferable that the correction unit 103 inputs attribute data indicating an attribute of each of the pixels of the image data and switches, for each of the blocks, whether to perform the edge correction in accordance with the attribute indicated by the attribute data.

For example, by switching so as to correct the block with attributes of characters and figures and not to correct the block with the attribute of photograph, it is possible to exclude the blocks of the attribute of photograph from the correction target. There may be a case where an image region of a photograph undergoes low-pass filter processing, or the like, for noise removal, and causes an unclear contrast difference between the object and the background, making it difficult to be detected as an edge. Moreover, since there are not so many regions having flat object density, density variation due to sweeping of the toner is originally less noticeable, and thus, the effect of correction would be smaller. On the other hand, performing correction might cause unintended density variation. Accordingly, by excluding a pixel having an attribute of photograph from the correction subject, it is possible to prevent newly-generated image quality deterioration.

At the time of switching, the correction unit 103 converts the attribute in units of pixels into the attribute in units of blocks. For example, the correction unit 103 can convert the attribute of the block into a character in a case where there is at least one pixel having an attribute of character within the block, and can convert the attribute of the block into a figure in a case where there is no pixel having an attribute of character but there is at least one pixel having the attribute of figure. In another case where there are no pixels having attributes of character or figure but there is a pixel having an attribute of photograph, the correction unit 103 can convert the attribute of the block into a photograph.

Moreover, while the exemplary correction of sweeping has been described, the correction unit 103 can perform edge correction according to the correction content such as smoothing (anti-aliasing) processing, outline emphasizing processing. For example, in the case of smoothing processing, the correction unit 103 can set a block of interest within a range of two blocks from the edge, that is, a block of interest including an outline pixel of the object and a block of a background adjacent to the block of interest and having a maximum value Max smaller than that of the block of interest as targets of correction. The correction unit 103 can perform correction to smooth the density change around the edge by performing correction of decreasing the maximum value Max and the minimum value min of the block of interest and increasing the maximum value Max and the minimum value min of the background block.

The replacement unit 104 overwrites the maximum value Max and the minimum value min of each of the blocks of the image data compressed by the compression processing unit 1 with the maximum value Max and the minimum value min corrected by the correction unit 103, thereby replacing the compressed image data with the corrected image data. By decompressing the corrected image data by the decompression processing unit 2, it is possible to obtain the image data having the same resolution and data size as the original image data as described above.

FIG. 10 illustrates the image data obtained by correcting the compressed image data illustrated in FIG. 7 and the image data obtained by decompressing the corrected data.

As illustrated in FIGS. 7 and 10, due to the correction, both the maximum value Max and the minimum value min in block B11 decreases from 255 to 220. In block B12 closer to the edge than block B11, the maximum value Max decreases from 255 to 200, the degree of decrease is much greater than in block B1. When the corrected image data are decompressed, the pixel value of each of the pixels having original pixel value 25 in block B11 is converted to 220, and the pixel value of the pixel having the original pixel value 255 is converted to 220 in block B12. From this, it is observed that the closer to the edge of the rear end, the greater decrease in the pixel value in the image data obtained.

As described above, the image forming apparatus G of the present embodiment includes an image processing apparatus A that includes: the compression processing unit 1 configured to divide each of pixels of image data in units of blocks and compress the image data using a maximum value and a minimum value of a pixel value in each of the divided blocks; the extraction unit 101 configured to extract a maximum value and a minimum value of each of the blocks from the image data compressed by the compression processing unit 1; the edge detection unit 102 configured to detect an edge of an object on the basis of at least one of the maximum value and the minimum value of each of the blocks, extracted by the extraction unit 101; the correction unit 103 configured to perform edge correction of the compressed image data by increasing or decreasing the maximum value and the minimum value of each of the blocks within a correction range from the edge detected by the edge detection unit 102; and the decompression processing unit 2 configured to decompress the image data that have undergone edge correction performed by the correction unit 103, using the maximum value and the minimum value of each of the blocks.

Since the target of edge correction is the maximum value Max and the minimum value min of the compressed image data, the amount of data to be corrected is small. Accordingly, it is possible to reduce the time needed for the correction even in a case where the correction is performed by either software processing or hardware processing. Moreover, in a case where the correction is performed by hardware processing, the capacity of the memory that holds the data to be corrected can be suppressed, leading to suppression of expansion of the circuit scale. While compressed image data are corrected, the position of the edge serving as a reference for correction does not change from the position in the original image data, and thus, it is possible to perform highly accurate edge correction.

The above-described embodiment is a preferred example of the present invention, and the present invention is not limited thereto. The embodiments can appropriately be modified without departing from the scope and spirit of the present invention.

For example, it is possible to cause the controller 11 to execute the processing procedure of the above-described edge correction unit 100 by causing the controller 11 to read the program. Moreover, it is possible to cause a computer such as a general-purpose PC other than the image forming apparatus G to read the program and to execute the processing procedure described above.

As a computer readable medium for the program, it is possible to apply a non-volatile memory such as a ROM, a flash memory, and a portable recording medium such as a CD-ROM. Moreover, carrier waves are also applied as a medium for providing program data via a communication line.

Although embodiments of the present invention have been described and illustrated in detail, it is clearly understood that the same is by way of illustration and example only and not limitation, the scope of the present invention should be interpreted by terms of the appended claims.

What is claimed is:

1. An image processing apparatus comprising
a hardware processor that:
    divides pixels of image data in units of blocks, and compresses, for each block, the image data using a maximum value and a minimum value among pixel values of each of the blocks;
    extracts a maximum value and a minimum value of each of the blocks from the compressed image data;
    detects an edge of an object based on at least one of the extracted maximum value and minimum value of each of the blocks;
    performs edge correction on the compressed image data by increasing or decreasing the maximum value and the minimum value of each of the blocks within a correction range from the detected edge; and
    decompresses the image data that has undergone the edge correction, using the corrected maximum value and minimum value of each of the blocks,
wherein:
    the edge detection detects an edge of a front end or a rear end of the object in a shift direction of an image formed by toner, and
    the edge correction adjusts, based on a distance from the detected edge of the front end or the rear end of the object, a correction amount to the maximum value and the minimum value of each of the blocks inside the object within the correction range from the detected edge.

2. The image processing apparatus according to claim 1, wherein, in a case where an orientation of a sheet is rotated and an image to be formed is also rotated in accordance with the rotation of the sheet, the edge detection rotates the orientation of the image data in accordance with a shift direction of the rotated image and detect the edge of the front end or the rear end of the object.

3. The image processing apparatus according to claim 1, wherein the edge correction inputs attribute data indicating an attribute of each of the pixels of the image data and switches, for each of the blocks, whether to perform the edge correction based on the attribute indicated by the attribute data.

4. The image processing apparatus according to claim 1, wherein the hardware processor uses a BTC compression method in compressing the image data of each of the blocks.

5. An image forming apparatus comprising:
a hardware processor that controls the image forming apparatus; and
an image forming part that forms an image on a sheet by toner based on image data, wherein:
the hardware processor:
    divides pixels of the image data in units of blocks, and compresses, for each block, the image data using a maximum value and a minimum value among pixel values of each of the blocks;
    extracts a maximum value and a minimum value of each of the blocks from the compressed image data;
    detects an edge of an object based on at least one of the extracted maximum value and minimum value of each of the blocks;
    performs edge correction on the compressed image data by increasing or decreasing the maximum value and the minimum value of each of the blocks within a correction range from the detected edge; and
    decompresses the image data that has undergone the edge correction, using the corrected maximum value and minimum value of each of the blocks,
the image forming part forms an image on a sheet by toner based on the decompressed image data,
the edge detection detects an edge of a front end or a rear end of the object in a shift direction of the image formed by toner, and
the edge correction adjusts, based on a distance from the detected edge of the front end or the rear end of the object, a correction amount to the maximum value and the minimum value of each of the blocks inside the object within the correction range from the detected edge.

6. The image forming apparatus according to claim 5, wherein, in a case where an orientation of a sheet is rotated by the image forming part and an image to be formed is also rotated in accordance with the rotation of the sheet, the edge detection rotates the orientation of the image data in accordance with a shift direction of the rotated image and detects the edge of the front end or the rear end of the object.

7. The image forming apparatus according to claim 5, wherein the edge correction inputs attribute data indicating an attribute of each of the pixels of the image data and switches, for each of the blocks, whether to perform the edge correction based on the attribute indicated by the attribute data.

8. The image forming apparatus according to claim 5, wherein the hardware processor uses a BTC compression method in compressing the image data of each of the blocks.

9. A non-transitory recording medium storing a computer readable program causing a computer to execute operations of:
(a) dividing pixels of image data in units of blocks, and compressing, for each block, the image data using a maximum value and a minimum value among pixel values of each of the blocks;
(b) extracting a maximum value and a minimum value of each of the blocks from the compressed image data;
(c) detecting an edge of an object based on at least one of the extracted maximum value and minimum value of each of the blocks;
(d) performing edge correction on the compressed image data by increasing or decreasing the maximum value and the minimum value of each of the blocks within a correction range from the detected edge; and
(e) decompressing the image data that has undergone the edge correction using the corrected maximum value and minimum value of each of the blocks,
wherein:
in detecting the edge of the object, the program causes the computer to detect an edge of a front end or a rear end of the object in a shift direction of an image formed by toner, and
in performing the edge correction, the program causes the computer to adjust, based on a distance from the detected edge of the front end or the rear end of the object, a correction amount to the maximum value and the minimum value of each of the blocks inside the object within the correction range from the detected edge.

10. The non-transitory recording medium according to claim 9,
wherein, in a case where an orientation of a sheet is rotated and an image to be formed is also rotated in accordance with the rotation of the sheet, the program causes the computer to rotate the orientation of the image data in accordance with a shift direction of the rotated image and detect the edge of the front end or the rear end of the object.

11. The non-transitory recording medium according to claim 9,
wherein in performing the edge correction, the program causes the computer to input attribute data indicating an attribute of each of the pixels of the image data and switches, for each of the blocks, whether to perform the edge correction based on the attribute indicated by the attribute data.

12. The non-transitory recording medium according to claim 9, wherein the program causes the computer to execute BTC compression in compressing the image data of each of the blocks.

* * * * *